United States Patent
Addanki et al.

(10) Patent No.: US 9,565,028 B2
(45) Date of Patent: Feb. 7, 2017

(54) INGRESS SWITCH MULTICAST DISTRIBUTION IN A FABRIC SWITCH

(71) Applicant: BROCADE COMMUNICATIONS SYSTEMS, INC., San Jose, CA (US)

(72) Inventors: Venkata R. K. Addanki, Cupertino, CA (US); Shunjia Yu, San Jose, CA (US); Mythilikanth Raman, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 373 days.

(21) Appl. No.: 14/284,212

(22) Filed: May 21, 2014

(65) Prior Publication Data

US 2014/0362854 A1 Dec. 11, 2014

Related U.S. Application Data

(60) Provisional application No. 61/833,385, filed on Jun. 10, 2013.

(51) Int. Cl.
*H04L 12/28* (2006.01)
*H04L 12/18* (2006.01)
*H04L 12/761* (2013.01)
*H04L 12/931* (2013.01)

(52) U.S. Cl.
CPC ......... *H04L 12/185* (2013.01); *H04L 12/1886* (2013.01); *H04L 45/16* (2013.01); *H04L 49/201* (2013.01)

(58) Field of Classification Search
None
See application file for complete search history.

(56) References Cited

U.S. PATENT DOCUMENTS

| | | | |
|---|---|---|---|
| 829,529 | A | 8/1906 | Keathley |
| 5,390,173 | A | 2/1995 | Spinney |
| 5,802,278 | A | 9/1998 | Isfeld |
| 5,878,232 | A | 3/1999 | Marimuthu |
| 5,959,968 | A | 9/1999 | Chin |
| 5,973,278 | A | 10/1999 | Wehrill, III |

(Continued)

FOREIGN PATENT DOCUMENTS

| | | |
|---|---|---|
| CN | 102801599 A | 11/2012 |
| CN | 102801599 A | 11/2012 |

(Continued)

OTHER PUBLICATIONS

Rosen, E. et al., "BGP/MPLS VPNs", Mar. 1999.

(Continued)

*Primary Examiner* — Minh-Trang Nguyen
(74) *Attorney, Agent, or Firm* — Shun Yao; Park, Vaughan, Fleming & Dowler LLP

(57) ABSTRACT

One embodiment of the present invention provides a switch. The switch includes an inter-switch multicast module and an edge multicast module. The inter-switch multicast module identifies for a first replication of a multicast packet an egress inter-switch port in a multicast tree rooted at the switch. The multicast tree is identified by an identifier of the switch. The edge multicast module identifies an egress edge port for a second replication of the multicast packet based on a multicast group identifier. The multicast group identifier is local within the switch.

25 Claims, 10 Drawing Sheets

(56) References Cited

U.S. PATENT DOCUMENTS

| | | |
|---|---|---|
| 5,983,278 A | 11/1999 | Chong |
| 6,041,042 A | 3/2000 | Bussiere |
| 6,085,238 A | 7/2000 | Yuasa |
| 6,104,696 A | 8/2000 | Kadambi |
| 6,185,214 B1 | 2/2001 | Schwartz |
| 6,185,241 B1 | 2/2001 | Sun |
| 6,331,983 B1 * | 12/2001 | Haggerty .............. H04L 12/185 370/400 |
| 6,438,106 B1 | 8/2002 | Pillar |
| 6,498,781 B1 | 12/2002 | Bass |
| 6,542,266 B1 | 4/2003 | Phillips |
| 6,633,761 B1 | 10/2003 | Signhal |
| 6,771,610 B1 | 8/2004 | Seaman |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Signhal |
| 7,016,352 B1 | 3/2006 | Chow |
| 7,061,877 B1 | 6/2006 | Gummalla |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,706,905 B1 | 4/2014 | McGlaughlin |
| 8,724,456 B1 | 5/2014 | Hong |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0091795 A1 | 7/2002 | Yip |
| 2003/0041085 A1 | 2/2003 | Sato |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0208616 A1 | 11/2003 | Laing |
| 2003/0216143 A1 | 11/2003 | Roese |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0122979 A1 | 6/2005 | Gross |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1 | 2/2006 | Makishima et al. |
| 2006/0029055 A1 | 2/2006 | Perera |
| 2006/0034292 A1 | 2/2006 | Wakayama |
| 2006/0036765 A1 | 2/2006 | Weyman |

(56) References Cited

U.S. PATENT DOCUMENTS

| | | |
|---|---|---|
| 2006/0059163 A1 | 3/2006 | Frattura |
| 2006/0062187 A1 | 3/2006 | Rune |
| 2006/0072550 A1 | 4/2006 | Davis |
| 2006/0083254 A1 | 4/2006 | Ge |
| 2006/0093254 A1 | 5/2006 | Mozdy |
| 2006/0098589 A1 | 5/2006 | Kreeger |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2007/0036178 A1 | 2/2007 | Hares |
| 2007/0053294 A1 | 3/2007 | Ho |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0258449 A1 | 11/2007 | Bennett |
| 2007/0274234 A1 | 11/2007 | Kubota |
| 2007/0289017 A1 | 12/2007 | Copeland, III |
| 2008/0052487 A1 | 2/2008 | Akahane |
| 2008/0056135 A1 | 3/2008 | Lee |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1* | 4/2009 | Lapuh .................... H04L 49/70 370/228 |
| 2009/0106405 A1 | 4/2009 | Mazarick |
| 2009/0116381 A1 | 5/2009 | Kanda |
| 2009/0129384 A1 | 5/2009 | Regan |
| 2009/0138577 A1 | 5/2009 | Casado |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245137 A1 | 10/2009 | Hares |
| 2009/0245242 A1 | 10/2009 | Carlson |
| 2009/0246137 A1 | 10/2009 | Hadida |
| 2009/0252049 A1 | 10/2009 | Ludwig |
| 2009/0252061 A1 | 10/2009 | Small |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0287262 A1 | 11/2010 | Elzur |
| 2010/0287548 A1 | 11/2010 | Zhou |
| 2010/0290464 A1* | 11/2010 | Assarpour ............... H04L 45/00 370/390 |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |

(56) References Cited

U.S. PATENT DOCUMENTS

| | | |
|---|---|---|
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0177039 A1 | 7/2012 | Berman |
| 2012/0210416 A1 | 8/2012 | Mihelich |
| 2012/0243539 A1 | 9/2012 | Keesara |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1* | 11/2012 | Kamble .............. H04L 49/356 370/230.1 |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003535 A1 | 1/2013 | Sarwar |
| 2013/0003737 A1 | 1/2013 | Sinicrope |
| 2013/0003738 A1 | 1/2013 | Koganti |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0124707 A1 | 5/2013 | Ananthapadmanabha |
| 2013/0127848 A1 | 5/2013 | Joshi |
| 2013/0136123 A1 | 5/2013 | Ge |
| 2013/0148546 A1 | 6/2013 | Eisenhauer |
| 2013/0194914 A1 | 8/2013 | Agarwal |
| 2013/0219473 A1 | 8/2013 | Schaefer |
| 2013/0250951 A1 | 9/2013 | Koganti |
| 2013/0259037 A1 | 10/2013 | Natarajan |
| 2013/0272135 A1 | 10/2013 | Leong |
| 2013/0294451 A1 | 11/2013 | Li |
| 2013/0301642 A1 | 11/2013 | Radhakrishnan |
| 2013/0346583 A1 | 12/2013 | Low |
| 2014/0013324 A1 | 1/2014 | Zhang |
| 2014/0025736 A1 | 1/2014 | Wang |
| 2014/0044126 A1 | 2/2014 | Sabhanatarajan |
| 2014/0056298 A1 | 2/2014 | Vobbilisetty |
| 2014/0105034 A1 | 4/2014 | Sun |
| 2015/0010007 A1 | 1/2015 | Matsuhira |
| 2015/0030031 A1 | 1/2015 | Zhou |
| 2015/0143369 A1 | 5/2015 | Zheng |

FOREIGN PATENT DOCUMENTS

| | | |
|---|---|---|
| EP | 0579567 | 5/1993 |
| EP | 0993156 A2 | 12/2000 |
| EP | 1398920 A2 | 3/2004 |
| EP | 2001167 A1 | 8/2007 |
| EP | 2001167 A1 | 8/2007 |
| EP | 1916807 A2 | 10/2007 |
| EP | 1916807 A2 | 4/2008 |
| WO | 2008056838 | 5/2008 |
| WO | 2009042919 | 4/2009 |
| WO | 2010111142 A1 | 9/2010 |
| WO | 2010111142 A1 | 9/2010 |
| WO | 2014031781 | 2/2014 |

OTHER PUBLICATIONS

Office Action for U.S. Appl. No. 14/577,785, filed Dec. 19, 2014, dated Apr. 13, 2015.

Office Action for U.S. Appl. No. 13/786,328, filed Mar. 5, 2013, dated Mar. 13, 2015.

Office Action for U.S. Appl. No. 13/425,238, filed Mar. 20, 2012, dated Mar. 12, 2015.

Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.

Office Action dated Feb. 11, 2016, U.S. Appl. No. 14/488,173, filed Sep. 16, 2014.

Office Action dated Feb. 24, 2016, U.S. Appl. No. 13/971,397, filed Aug. 20, 2013.

Office Action dated Feb. 24, 2016, U.S. Appl. No. 12/705,508, filed Feb. 12, 2010.

Zhai F. Hu et al. 'RBridge: Pseudo-Nickname; draft-hu-trill-pseudonode-nickname-02.txt', May 15, 2012.

Mahalingam "VXLAN: A Framework for Overlaying Virtualized Layer 2 Networks over Layer 3 Networks" Oct. 17, 2013 pp. 1-22, Sections 1, 4 and 4.1.

Office action dated Apr. 30, 2015, U.S. Appl. No. 13/351,513, filed Jan. 17, 2012.

Office Action dated Apr. 1, 2015, U.S. Appl. No. 13/656,438, filed Oct. 19, 2012.

Office Action dated May 21, 2015, U.S. Appl. No. 13/288,822, filed Nov. 3, 2011.

(56) References Cited

OTHER PUBLICATIONS

Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 215, U.S. Appl. No. 13/098,490, filed May 2, 2011.
Office Action dated Jun. 16, 2015, U.S. Appl. No. 13/048,817, filed Mar. 15, 2011.
Huang, Nen-Fu et al. "An Effective Spanning Tree Algorithm for a Bridged LAN", Mar. 16, 1992.
Zhai, H. et al., "RBridge: Pseudo-Nickname draft-hu-trill-pseudonode-nickname-02.", May 15, 2012.
Narten, T. et al. "Problem Statement: Overlays for Network Virtualization draft-narten-nvo3-overlay-problem-statement-01", Oct. 31, 2011.
Knight, Paul et al. "Layer 2 and 3 Virtual Private Networks: Taxonomy, Technology, and Standardization Efforts", 2004.
An Introduction to Brocade VCS Fabric Technology, Dec. 3, 2012.
Kreeger, L. et al. "Network Virtualization Overlay Control Protocol Requirements draft-kreeger-nvo3-overlay-cp-00", Aug. 2, 2012.
Knight, Paul et al., "Network based IP VPN Architecture using Virtual Routers", May 2003.
Louati, Wajdi et al., "Network-Based Virtual Personal Overlay Networks Using Programmable Virtual Routers", 2005.
Brocade Unveils "The Effortless Network", 2009.
The Effortless Network: HyperEdge Technology for the Campus LAN, 2012.
Foundary FastIron Configuration Guide, Software Release FSX 04.2.00b, Software Release FWS 04.3.00, Software Release FGS 05.0.00a, 2008.
FastIron and TurboIron 24x Configuration Guide, 2010.
FastIron Configuration Guide, Supporting IronWare Software Release 07.0.00, 2009.
Christensen, M. et al., Considerations for Internet Group Management Protocol (IGMP) and Multicast Listener Discovery (MLD) Snooping Switches, 2006.
Perlman, Radia et al. "RBridges: Base Protocol Specification", <draft-ietf-trill-rbridge-protocol-16.txt>, 2010.
Brocade Fabric OS (FOS) 6.2 Virtual Fabrics Feature Frequently Asked Questions, 2009.
Eastlake III, Donald et al., "RBridges: TRILL Header Options", 2009.
Perlman, Radia "Challenges and Opportunities in the Design of TRILL: a Routed layer 2 Technology", 2009.
Perlman, Radia et al., "RBridge VLAN Mapping", <draft-ietf-trill-rbridge-vlan-mapping-01.txt>, 2009.
Knight, S. et al., "Virtual Router Redundancy Protocol", 1998.
"Switched Virtual Internetworking moves beyond bridges and routers", 8178 Data Communications Sep. 23, 1994, No. 12.
Touch, J. et al., "Transparent Interconnection of Lots of Links (TRILL): Problem and Applicability Statement", 2009.
Lapuh, Roger et al., "Split Multi-link Trunking (SMLT)", 2002.
Lapuh, Roger et al., "Split Multi-Link Trunking (SMLT) draft-Lapuh-network-smlt-08", 2009.
Nadas, S. et al., "Virtual Router Redundancy Protocol (VRRP) Version 3 for IPv4 and IPv6", 2010.
Office action dated Sep. 12, 2012, U.S. Appl. No. 12/725,249, filed Mar. 16, 2010.
Office action dated Apr. 26, 2012, U.S. Appl. No. 12/725,249, filed Mar. 16, 2010.
Office action dated Dec. 5, 2012, U.S. Appl. No. 13/087,239, filed Apr. 14, 2011.
Office action dated May 22, 2013, U.S. Appl. No. 13/087,239, filed Apr. 14, 2011.
Office action dated Dec. 21, 2012, U.S. Appl. No. 13/098,490, filed May 2, 2011.
Office action dated Jul. 9, 2013, U.S. Appl. No. 13/098,490, filed May 2, 2011.
Office action dated Mar. 27, 2014, U.S. Appl. No. 13/098,490, filed May 2, 2011.
Office action dated Feb. 5, 2013, U.S. Appl. No. 13/092,724, filed Apr. 22, 2011.
Office action dated Jul. 16, 2013, U.S. Appl. No. 13/092,724, filed Jul. 16, 2013.
Office action dated Apr. 9, 2014, U.S. Appl. No. 13/092,724, filed Apr. 22, 2011.
Office action dated Jun. 10, 2013, U.S. Appl. No. 13/092,580, filed Apr. 22, 2011.
Office action dated Jan. 10, 2014, U.S. Appl. No. 13/092,580, filed Apr. 22, 2011.
Office action dated Mar. 18, 2013, U.S. Appl. No. 13/042,259, filed Mar. 7, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jun. 21, 2013, U.S. Appl. No. 13/092,460, filed Apr. 22, 2011.
Office action dated Mar. 14, 2014, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Mar. 26, 2014, U.S. Appl. No. 13/092,701, filed Apr. 22, 2011.
Office action dated Feb. 5, 2013, U.S. Appl. No. 13/092,752, filed Apr. 22, 2011.
Office action dated Jul. 18, 2013, U.S. Appl. No. 13/092,752, filed Apr. 22, 2011.
Office action dated Apr. 9, 2014, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Mar. 4, 2013, U.S. Appl. No. 13/092,877, filed Apr. 22, 2011.
Office action dated Sep. 5, 2013, U.S. Appl. No. 13/092,877, filed Apr. 22, 2011.
Office action dated Jan. 6, 2014, U.S. Appl. No. 13/092,877, filed Apr. 22, 2011.
Office action dated Jun. 20, 2014, U.S. Appl. No. 13/092,877, filed Apr. 22, 2011.
Office action dated Jun. 7, 2012, U.S. Appl. No. 12/950,968, filed Nov. 19, 2010.
Office action dated Jan. 4, 2013, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Oct. 2, 2013, U.S. Appl. No. 13/044,326, filed Mar. 9, 2011.
Office action dated Dec. 3, 2012, U.S. Appl. No. 13/030,806, filed Feb. 18, 2011.
Office action dated Jun. 11, 2013, U.S. Appl. No. 13/030,806, filed Feb. 18, 2011.
Office action dated Apr. 22, 2014, U.S. Appl. No. 13/030,806, filed Feb. 18, 2011.
Office action dated Apr. 25, 2013, U.S. Appl. No. 13/030,688, filed Feb. 18, 2011.
Office action dated Jun. 11, 2013, U.S. Appl. No. 13/044,301, filed Mar. 9, 2011.
Office action dated Feb. 22, 2013, U.S. Appl. No. 13/044,301, filed Mar. 9, 2011.

(56) References Cited

OTHER PUBLICATIONS

Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Dec. 2, 2013, U.S. Appl. No. 13/184,526, filed Jul. 16, 2011.
Office action dated Jun. 19, 2013, U.S. Appl. No. 13/092,873, filed Apr. 22, 2011.
Office action dated Nov. 29, 2013, U.S. Appl. No. 13/092,873, filed Apr. 22, 2011.
Office action dated Jul. 23, 2013, U.S. Appl. No. 13/365,993, filed Feb. 3, 2012.
Office action dated Jul. 18, 2013, U.S. Appl. No. 13/365,808, filed Feb. 3, 2012.
Office action dated Mar. 6, 2014, U.S. Appl. No. 13/425,238, filed Mar. 20, 2012.
Office action dated Jun. 13, 2013, U.S. Appl. No. 13/312,903, filed Dec. 6, 2011.
Office action dated Nov. 12, 2013, U.S. Appl. No. 13/312,903, filed Dec. 6, 2011.
Office action dated Jun. 18, 2014, U.S. Appl. No. 13/440,861, filed Apr. 5, 2012.
Office action dated Feb. 28, 2014, U.S. Appl. No. 13/351,513, filed Jan. 17, 2012.
Office action dated May 9, 2014, U.S. Appl. No. 13/484,072, filed May 30, 2012.
Office action dated Oct. 21, 2013, U.S. Appl.No. 13/533,843, filed Jun. 26, 2012.
Office action dated May 14, 2014, U.S. Appl. No. 13/533,843, filed Jun. 26, 2012.
Office action dated Feb. 20, 2014, U.S. Appl. No. 13/598,204, filed Aug. 29, 2012.
Office action dated Jun. 6, 2014, U.S. Appl. No. 13/669,357, filed Nov. 5, 2012.
Office action dated Jul. 7, 2014, U.S. Appl. No. 13/044,326, filed Mar. 9, 2011.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'RBridges: Base Protocol Specification', IETF Draft, Perlman et al., Jun. 26, 2009.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Office action dated Aug. 29, 2014, U.S. Appl. No. 13/042,259, filed Mar. 7, 2011.
Office action dated Aug. 21, 2014, U.S. Appl. No. 13/184,526, filed Jul. 16, 2011.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.

FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P. et al: 'Layer 2 and 3 Virtual Private Networks: Taxonomy, Technology, and Standardization Efforts', IEEE Communications Magazine, IEEE Service Center, Piscataway, US, vol. 42, No. 6, Jun. 1, 2004 (Jun. 1, 2004), pp. 124-131, XP001198207, ISSN: 0163-6804, DOI: 10.1109/MCOM.2004.1304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-Link Trunking (SMLT)', Network Working Group, Oct. 2012.
Lapuh, Roger et al., 'Split Multi-link Trunking (SMLT) draft-lapuh-network-smlt-08', Jan. 2009.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-na rten-n vo3-over l ay-problem -statement-01', Oct. 31, 2011.
Office Action for U.S. Appl. No. 13/042,259, filed Mar. 7, 2011, dated Jan. 16, 2014.
Office Action for U.S. Appl. No. 13/087,239, filed Apr. 14, 2011, dated May 22, 2013.
Office Action for U.S. Appl. No. 13/092,724, filed Apr. 22, 2011, dated Jul. 16, 2013.
Office Action for U.S. Appl. No. 13/351,513, filed Jan. 17, 2012, dated Feb. 28, 2014.
Office Action for U.S. Appl. No. 13/533,843, filed Jun. 26, 2012, dated Oct. 21, 2013.
Perlman, Radia et al., 'Challenges and Opportunities in the Design of TRILL: a Routed layer 2 Technology', 2009.
S. Nadas et al., 'Virtual Router Redundancy Protocol (VRRP) Version 3 for IPv4 and IPv6', Internet Engineering Task Force, Mar. 2010.
Office action dated Aug. 4, 2014, U.S. Appl. No. 13/050,102, filed Mar. 17, 2011.
Perlman, Radia et al., 'RBridges: Base Protocol Specification; Draft-ietf-trill-rbridge-protocol-16.txt', Mar. 3, 2010, pp. 1-117.
'An Introduction to Brocade VCS Fabric Technology', Brocade white paper, http://community.brocade.com/docs/DOC-2954, Dec. 3, 2012.
U.S. Appl. No. 13/030,806 Office Action dated Dec. 3, 2012.
Brocade 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Lapuh, Roger et al., 'Split Multi-link Trunking (SMLT)', draft-lapuh-network-smlt-08, Jul. 2008.
Office Action for U.S. Appl. No. 13/092,752, filed Apr. 22, 2011, dated Jul. 18, 2013.
Office Action for U.S. Appl. No. 13/365,993, filed Feb. 3, 2012, dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.

(56) References Cited

OTHER PUBLICATIONS

Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/092,460, filed Apr. 22, 2011, dated Jun. 21, 2013.
Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/365,808, filed Jul. 18, 2013, dated Jul. 18, 2013.
Office Action for U.S. Appl. No. 13/092,887 dated Jan. 6, 2014.
Office Action for U.S. Appl. No. 13/030,806, filed Feb. 18, 2011, dated Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/598,204, filed Aug. 29, 2012, dated Feb. 20, 2014.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for Application No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/669,357, filed Nov. 5, 2012, dated Jan. 30, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.

(56) References Cited

OTHER PUBLICATIONS

Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Configuration and Management Protocol 1.0 (OF-Config 1.0) Dec. 23, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.

\* cited by examiner

INGRESS SWITCH MULTICAST DISTRIBUTION IN A FABRIC SWITCH

RELATED APPLICATIONS

This application claims the benefit of U.S. Provisional Application No. 61/833,385, titled "Virtual Cluster TRILL Source RBridge Multicast Distribution," by inventors Venkata R. K. Addanki, Shunjia Yu, and Mythilikanth Raman, filed 10 Jun. 2013, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, the disclosure of which is incorporated by reference herein.

BACKGROUND

Field

The present disclosure relates to communication networks. More specifically, the present disclosure relates to multicast distribution in a fabric switch.

Related Art

The exponential growth of the Internet has made it a popular delivery medium for a variety of applications running on physical and virtual devices. Such applications have brought with them an increasing demand for bandwidth. As a result, equipment vendors race to build larger and faster switches with versatile capabilities, such as distributed multicast traffic management, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While a fabric switch brings many desirable features to a network, some issues remain unsolved in facilitating efficient multicast traffic distribution for a large number of virtual servers.

SUMMARY

One embodiment of the present invention provides a switch. The switch includes an inter-switch multicast module and an edge multicast module. The inter-switch multicast module identifies for a first replication of a multicast packet an egress inter-switch port in a multicast tree rooted at the switch. The multicast tree is identified by an identifier of the switch. The edge multicast module identifies an egress edge port for a second replication of the multicast packet based on a multicast group identifier. The multicast group identifier is local within the switch.

In a variation on this embodiment, the inter-switch multicast module identifies the inter-switch port based on a bit value corresponding to the inter-switch port. The bit value is in an inter-switch bitmap associated with the multicast tree.

In a further variation, the inter-switch bitmap is included in an entry in a multicast switch identifier table. The entry in the multicast switch identifier table corresponds to the identifier of the switch.

In a further variation, the switch also includes a selection module which selects the multicast switch identifier table from a plurality of multicast switch identifier table instances based on a multicast group of the multicast packet. A respective multicast switch identifier table instance is associated with a respective multicast group.

In a variation on this embodiment, the edge multicast module identifies the edge port based on a bit value corresponding to the edge port. The bit value is in an edge bitmap associated with the multicast group identifier.

In a further variation, the edge bitmap is included in an entry in a multicast group identifier table. The entry in the multicast switch identifier table corresponds to the multicast group identifier.

In a variation on this embodiment, the multicast group identifier is mapped to a virtual local area network (VLAN) identifier of the multicast packet in a mapping table.

In a variation on this embodiment, the switch also includes a fabric switch management module which maintains a membership in a fabric switch. The fabric switch accommodates a plurality of switches and operates as a single switch.

In a further variation, the first replication of the multicast packet is encapsulated in a fabric encapsulation of the fabric switch. The inter-switch multicast module also identifies for a third replication of the multicast packet an egress inter-switch port in a second multicast tree rooted at a second switch. This second multicast tree is identified by an identifier of the second switch.

In a further variation, the edge multicast module also determines whether the multicast group identifier is associated with the multicast packet based on a VLAN identifier of the multicast packet.

BRIEF DESCRIPTION OF THE FIGURES

In the figures, like reference numerals refer to the same figure elements.

DETAILED DESCRIPTION

Figure 1A:
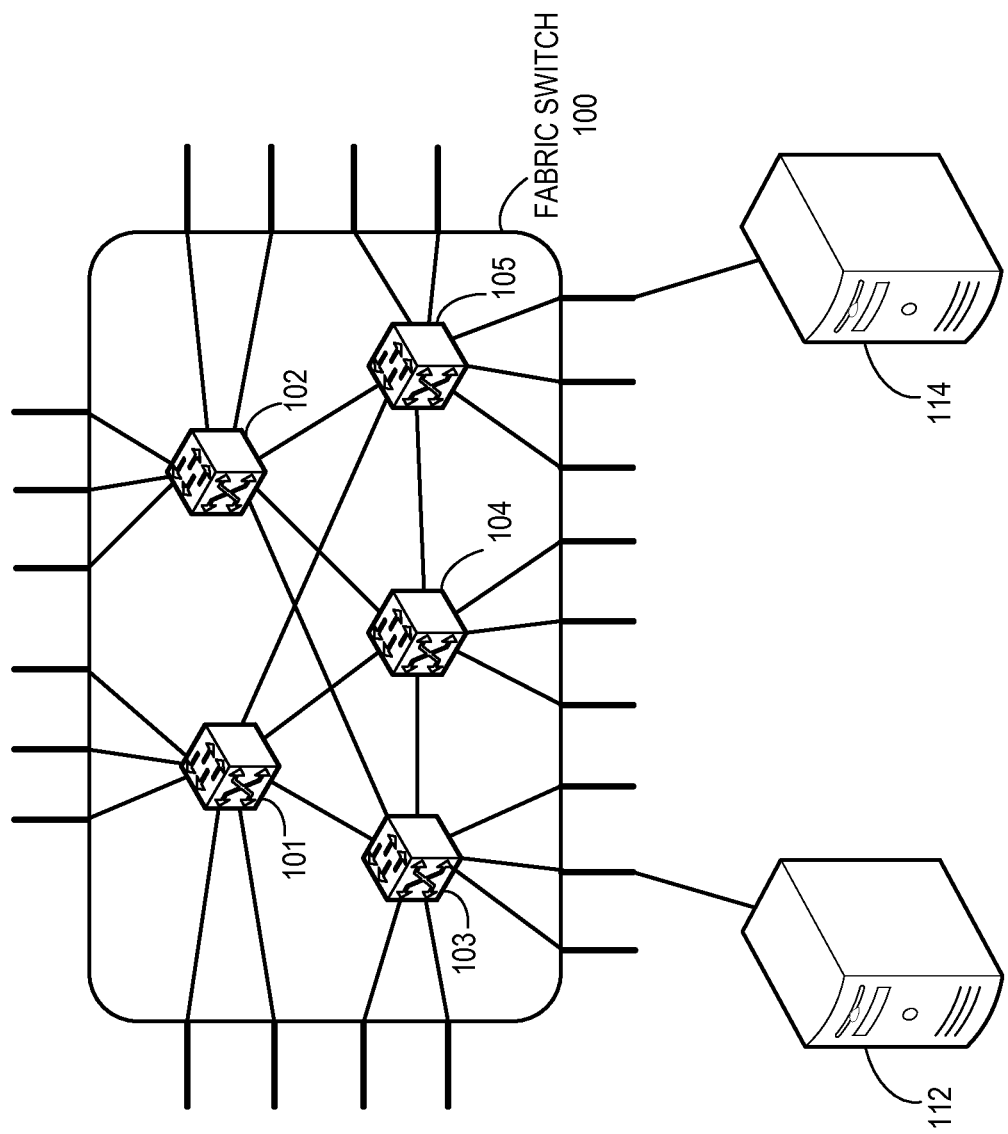
FIG. 1A illustrates an exemplary fabric switch with ingress switch multicast tree support, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficient multicast traffic distribution in a fabric switch is solved by facilitating a multicast distribution tree, which is referred to as an ingress switch multicast tree, at a respective member switch of the fabric switch. Upon receiving a multicast packet, the switch forwards the packet via its own ingress switch multicast tree.

With existing technologies, a fabric switch has a finite number of multicast distribution trees. The member switches forward traffic belonging to all multicast groups using these trees to distribute traffic. As a result, the member switches can forward multicast traffic belonging to a large number of multicast groups via a single tree. This can congest the links in the multicast tree, leading to inefficient forwarding and greater delay. This problem can be further aggravated when this number is small. For example, this finite number can typically be one (i.e., the fabric switch typically can have one multicast distribution tree). In that case, all member switches forward all multicast traffic via the same tree and cause the links of the tree to congest.

To solve this problem, a respective member switch computes its own ingress switch multicast tree and forwards multicast traffic via that tree. As a result, the multicast traffic load of the fabric switch becomes distributed among the ingress switch multicast trees of the corresponding member switches. Since different ingress switch multicast trees comprise different links of the fabric switch, the multicast traffic load becomes distributed across the links of the fabric switch instead of a few links of a finite number of trees.

In some embodiments, in a member switch, multicast packet replication is performed in two stages. In the first stage, the member switch replicates a multicast packet to its edge ports based on a multicast group identifier (MGID) representing the edge multicast replication of the switch. In some embodiments, this MGID is local to the switch and operates as a local multicast replication identifier for the switch. It should be noted that this multicast group identifier is distinct from a multicast group address of a multicast packet, which is not local and specific to a multicast group. In the second stage, the switch replicates the packet to inter-switch (IS) ports for other member switches based on the egress switch identifier of the packet.

In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In this disclosure, the term "fabric switch" refers to a number of interconnected physical switches which form a single, scalable logical switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "multicast" is used in a generic sense, and can refer to any traffic forwarding toward a plurality of recipients. Any traffic forwarding that creates and forwards more than one copy of the same packet in a fabric switch can be a referred to as "multicast." Examples of "multicast" traffic include, but are not limited to, broadcast, unknown unicast, and multicast traffic.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

Network Architecture

FIG. 1A illustrates an exemplary fabric switch with ingress switch multicast tree support, in accordance with an embodiment of the present invention. As illustrated in FIG. 1A, a fabric switch 100 includes member switches 101, 102, 103, 104, and 105. Switches 103 and 105 are coupled to end devices 112 and 114, respectively. In some embodiments, fabric switch 100 is a TRILL network and a respective member switch of fabric switch 100, such as switch 105, is a TRILL RBridge. In some further embodiments, fabric switch 100 is an IP network and a respective member switch of fabric switch 100, such as switch 105, is an IP-capable switch, which calculates and maintains a local IP routing table (e.g., a routing information base or RIB), and is capable of forwarding packets based on its IP addresses.

Switches in fabric switch 100 use edge ports to communicate with end devices (e.g., non-member switches) and inter-switch ports to communicate with other member switches. For example, switch 105 is coupled to end device 114 via an edge port and to switches 101, 102, and 104 via inter-switch ports and one or more links. Data communication via an edge port can be based on Ethernet and via an inter-switch port can be based on IP and/or TRILL protocol. It should be noted that control message exchange via inter-switch ports can be based on a different protocol (e.g., Internet Protocol (IP) or Fibre Channel (FC) protocol). Supporting multiple multicast trees in a TRILL network is specified in U.S. patent application Ser. No. 13/030,688 titled "Supporting multiple multicast trees in TRILL networks," by inventors Shunjia Yu, Nagarajan Venkatesan, Anoop Ghanwani, Phanidhar Koganti, Mythilikanth Raman, Rajiv Krishnamurthy, and Dilip Chatwani, the disclosure of which is incorporated herein in its entirety.

During operation, switch 103 receives a multicast packet from end device 112. Switch 103 is then the ingress switch of fabric switch 100 for that multicast packet. With existing technologies, fabric switch 100 has a finite number of multicast distribution trees. Suppose that one of these trees is rooted at switch 101. Upon receiving the multicast packet, switch 103 forwards the packet to switch 101, which in turn, forwards that packet to switches 102, 104, and 105 via the tree. Similarly, upon receiving a multicast packet from end device 114, switch 105 forwards the packet to switch 101, which in turn, forwards that packet to switches 102, 103, and 104 via the tree. Using the same tree to forward multicast traffic from different ingress switches can congest the links in the multicast tree, leading to inefficient forwarding and greater delay.

To solve this problem, a respective member switch of fabric switch 100 computes its own ingress switch multicast tree and forwards multicast traffic via that tree. For example, upon receiving a multicast packet, switch 103 forwards the packet via its ingress switch multicast tree. Similarly, upon receiving a multicast packet, switch 105 forwards the packet via its ingress switch multicast tree. As a result, these multicast packets become distributed in fabric switch 100 among the ingress switch multicast trees rooted at switches 103 and 105. Since different ingress switch multicast trees comprise different links of fabric switch 100, the multicast traffic load becomes distributed across the links of fabric switch 100 instead of a few links of a finite number of trees.

Figure 1B:
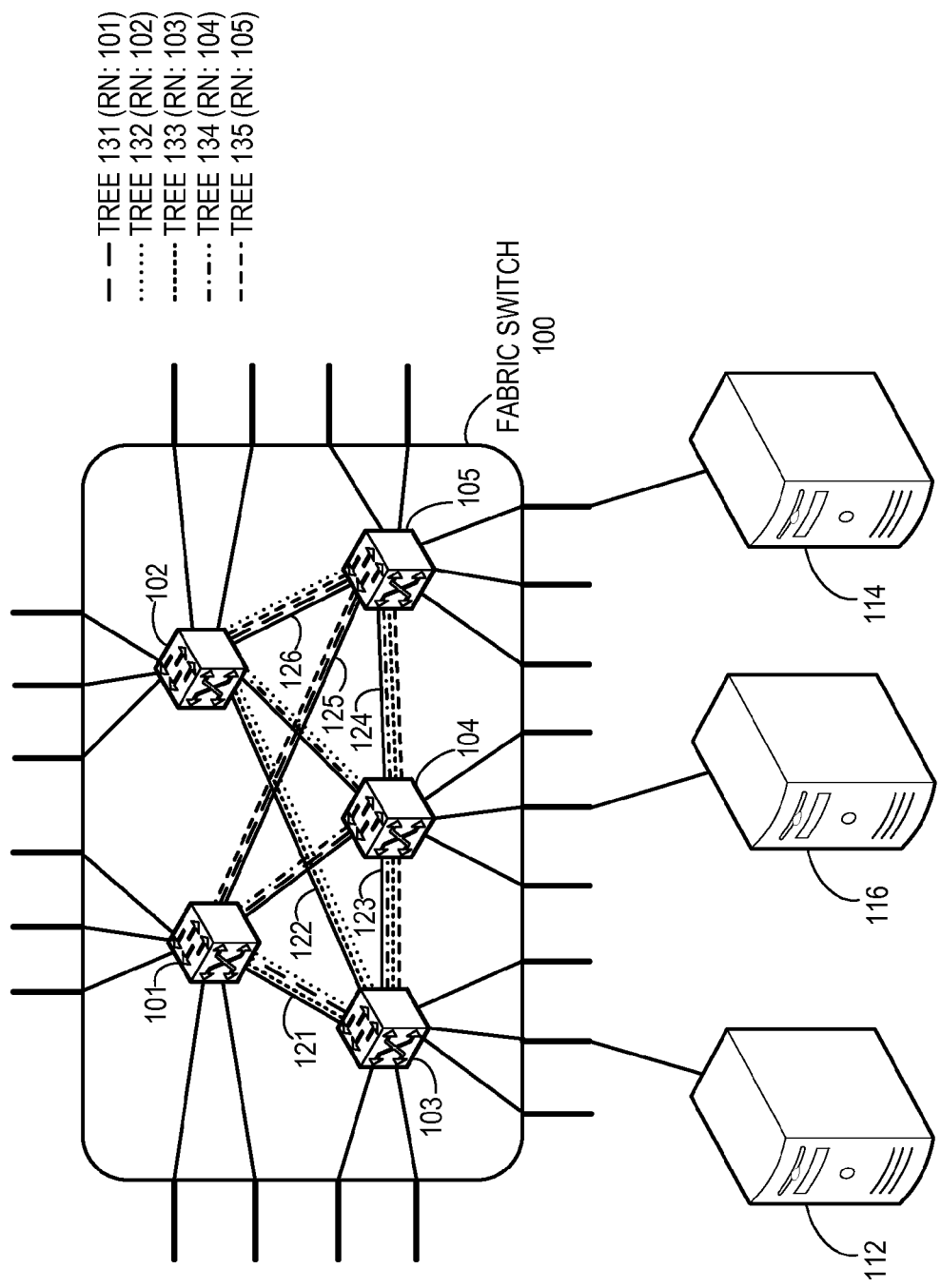
FIG. 1B illustrates exemplary ingress switch multicast trees in a fabric switch, in accordance with an embodiment of the present invention.

FIG. 1B illustrates exemplary ingress switch multicast trees in a fabric switch, in accordance with an embodiment of the present invention. During operation, switches 101, 102, 103, 104, and 105 compute ingress switch multicast trees 131, 132, 133, 134, and 135, respectively. In other words, trees 131, 132, 133, 134, and 135 have switches 101, 102, 103, 104, and 105 as their root node (RN), respectively. During operation, switch 103 receives a multicast packet from end device 112 and forwards the packet via ingress switch multicast tree 133. Ingress switch multicast tree 133 includes links 121, 122, 123, and 124. Switch 103 replicates the multicast packet and forwards the replicated packets via links 121, 122, and 123. Upon receiving the replicated packet, switch 104 further replicates the packet and forwards the replicated packet via link 124. Suppose that switch 104 is coupled to an end device 116, which is a receiver of the multicast group of the packet. Switch 104 then replicates the packet and forwards the packet via the edge port coupling end device 116.

Similarly, upon receiving a multicast packet from end device 114, switch 105 forwards the packet via ingress switch multicast tree 135. Ingress switch multicast tree 135 includes links 124, 125, 126, and 123. Switch 105 replicates the multicast packet and forwards the replicated packets via links 124, 125, and 126. Upon receiving the replicated packet, switch 104 further replicates the packet and forwards the replicated packet via link 123. If end device 116 is a receiver of the multicast group of the packet, switch 104 replicates the packet and forwards the packet via the edge port coupling end device 116.

Packet Headers

Figure 2:
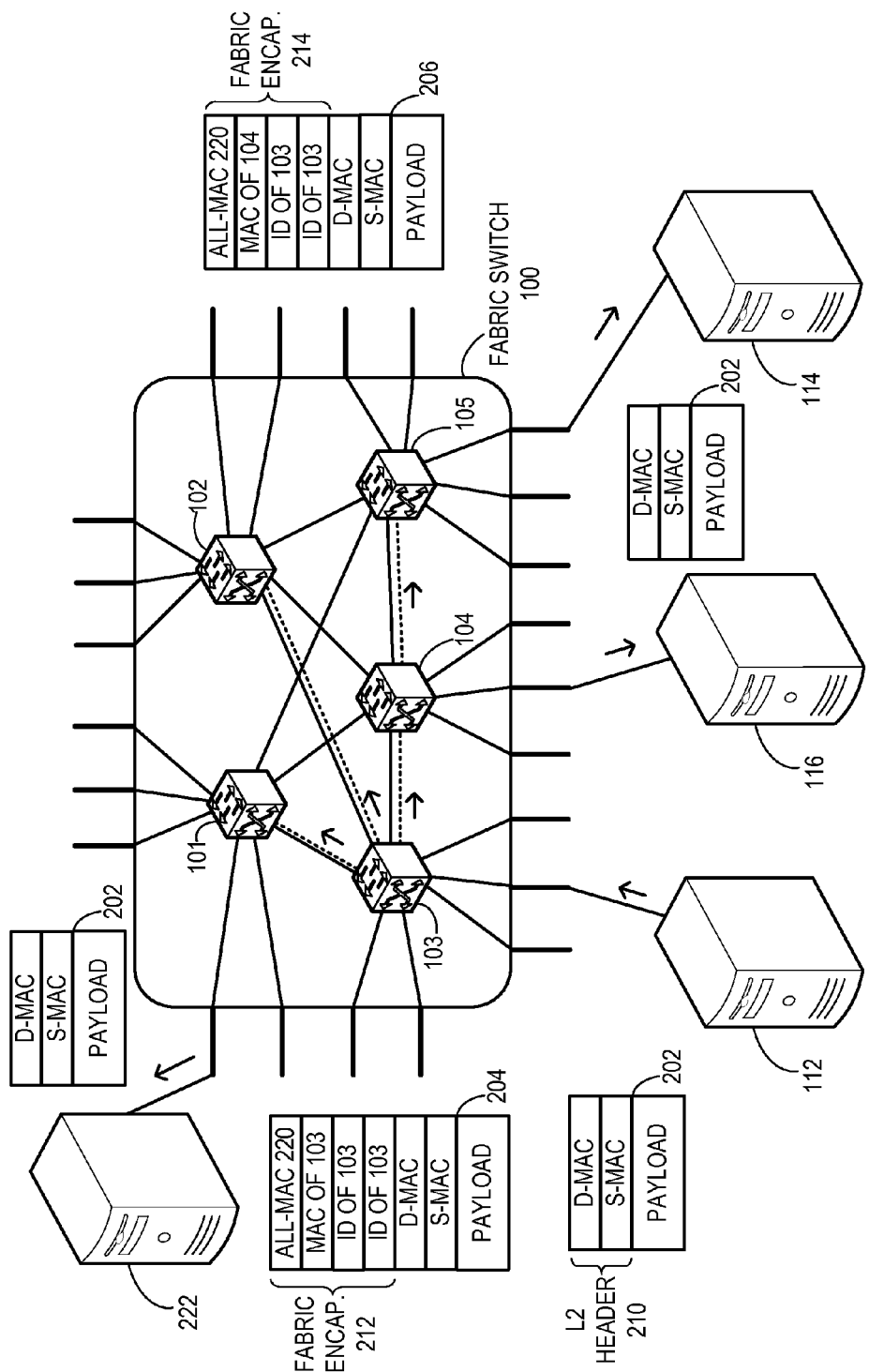
FIG. 2 illustrates exemplary packet headers for multicast traffic distribution via an ingress switch multicast tree in a fabric switch, in accordance with an embodiment of the present invention.

In some embodiments, in the example in FIG. 1B, switch 103 can encapsulate a received multicast packet forwarding to other member switches. FIG. 2 illustrates exemplary packet headers for multicast traffic distribution via an ingress switch multicast tree in a fabric switch, in accordance with an embodiment of the present invention. In this example, the ingress switch multicast tree is ingress switch multicast tree 133. During operation, switch 103 receives a multicast packet 202 from end device 112. This packet includes a layer-2 header 210 (e.g., an Ethernet header) comprising a source MAC addresses, a destination MAC addresses, and a payload. This payload can include an IP packet. It should be noted that packet 202 can be a broadcast or unknown unicast packet as well.

Switch 103 encapsulates packet 202 in a fabric encapsulation 212 to generate fabric-encapsulated packet 204. Examples of fabric encapsulation 212 include, but are not limited to, TRILL encapsulation and IP encapsulation. Fabric encapsulation 212 includes the identifier of switch 103 as both the ingress and the egress identifier. Examples of a switch identifier include, but are not limited to, an RBridge identifier, an IP version 4 address, and an IP version 6 address. Examples of fabric-encapsulated packet 204 include, but are not limited to, a TRILL frame and an IP packet. Fabric encapsulation 212 can also include an outer layer-2 header comprising an all-MAC address 220, which indicates that this packet is destined to all recipients in fabric switch 100. The outer layer-2 header also includes the MAC address of switch 103 as the source MAC address.

Switch 103 forwards fabric-encapsulated packet 204 via ingress switch multicast tree 133. Switches 101, 102, and 104 receive fabric-encapsulated packet 204, identify all-MAC address 220, and determine that this packet is a multicast packet. Switches 101, 102, and 104 also identify the identifier of switch 103 as egress switch identifier (which is also the ingress switch identifier), and recognize that the packet should be forwarded via ingress switch multicast tree 133 of switch 103. Switches 101 and 102 identify themselves as leaf nodes of ingress switch multicast tree 133. Suppose that switch 101 is coupled to end device 222, which is a recipient of packet 202. Switch 101 then removes fabric encapsulation 212, replicates inner packet 202, and forwards packet 202 to end device 222 via the corresponding edge port.

On the other hand, switch 104 detects that it is coupled to another downstream switch of ingress switch multicast tree 133. Switch 104 then replicates fabric-encapsulated packet 204 to generate fabric-encapsulated packet 206. However, because switch 104 is forwarding the packet, switch 104 changes the source MAC address of the outer layer-2 header to the MAC address of switch 104 to generate fabric encapsulation 214, and forwards fabric-encapsulated packet 206 to switch 105. Suppose that end device 116 is a recipient of packet 202. Switch 104 then also removes fabric encapsulation 212, replicates inner packet 202, and forwards packet 202 to end device 116 via the corresponding edge port.

Switch 105 receives fabric-encapsulated packet 206, identifies all-MAC address 220, and determines that this packet is a multicast packet. Switch 105 also identifies the identifier of switch 103 as the egress switch identifier (which is also the ingress switch identifier), and recognizes that the packet should be forwarded via ingress switch multicast tree 133 of switch 103. Switch 105 identifies itself as a leaf node of ingress switch multicast tree 133. Suppose that end device 114 is a recipient of packet 202. Switch 105 then removes fabric encapsulation 214, replicates inner packet 202, and forwards packet 202 to end device 114 via the corresponding edge port.

Multicast Replication

In the example in FIG. 2, switch 104 replicates a multicast packet via an edge port (e.g., for end device 116) and an IS port (e.g., for switch 105). In some embodiments, in switch 104, multicast packet replication is performed in two stages. In the first stage, switch 104 replicates a multicast packet to its edge ports based on an MGID representing the edge multicast replication of switch 104. In some embodiments, this MGID is local to switch 104 (i.e., is not included in a packet and unique only within switch 104) and operates as a local multicast replication identifier for switch 104. In the second stage, switch 104 replicates the packet to IS ports for other member switches based on the egress switch identifier of the packet. In the example in FIG. 2, the IS port is for switch 105 and the egress switch identifier is the identifier of switch 103.

Figure 3A:
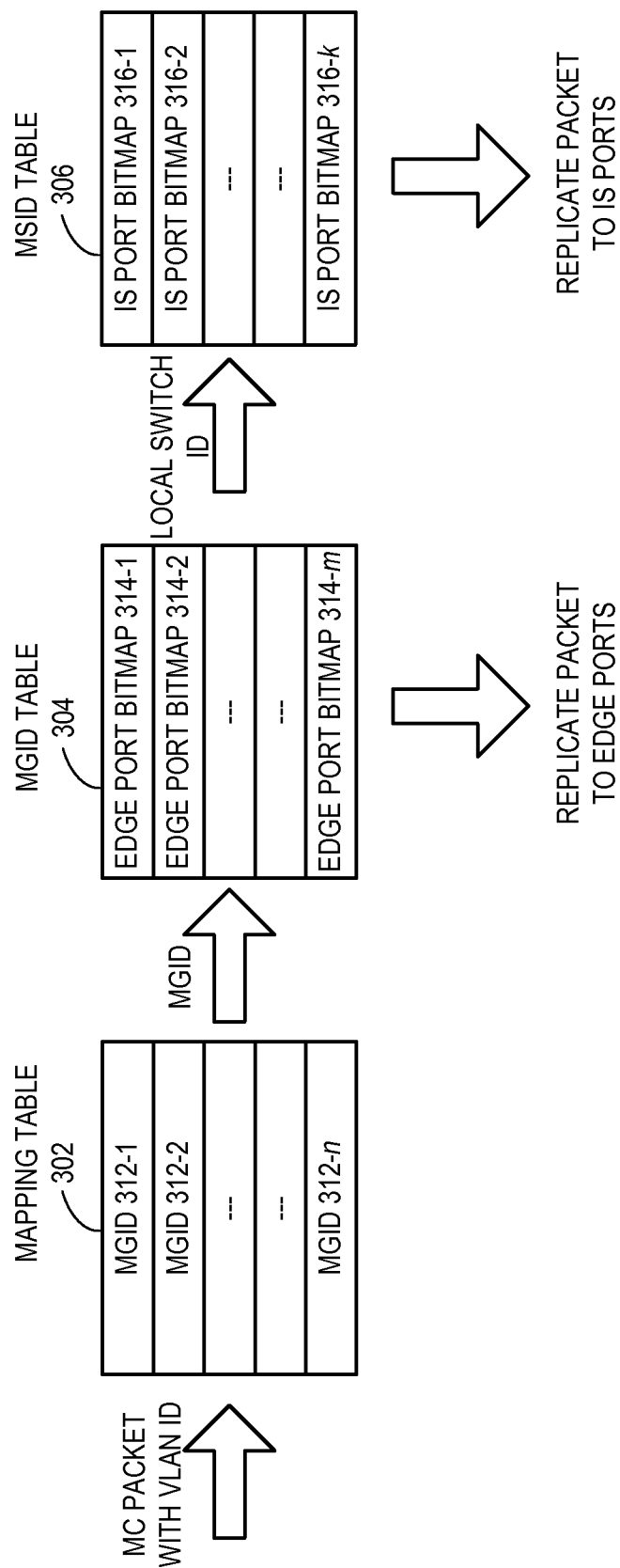
FIG. 3A illustrates an exemplary replication of multicast traffic received from an edge port via an ingress switch multicast tree in a fabric switch, in accordance with an embodiment of the present invention.

FIG. 3A illustrates an exemplary replication of multicast traffic received from an edge port via an ingress switch multicast tree in a fabric switch, in accordance with an embodiment of the present invention. When a multicast packet is received via the edge port of a switch, the switch obtains an MGID for the packet from a mapping table 302. Mapping table 302 maps an MGID with a virtual local area network (VLAN) identifier (VLAN ID). This VLAN identifier can be in the header of a packet (e.g., packet 202) and/or in the header of an encapsulated packet (e.g., fabric-encapsulated packet 204). For example this VLAN identifier can be a service VLAN (S-VLAN) and/or a customer VLAN (C-VLAN) identifier.

Mapping table 302 can also map one or more fields of a packet to an MGID, such as source and/or destination IP addresses, source and/or destination MAC addresses, source and/or destination ports, and a service and/or client VLANs. A respective entry in mapping table 302 can include the mapping or can be indexed based on VLAN identifiers. Mapping table 302 includes mapping for MGIDs 312-1, 312-2, . . . , 312-*n*. The switch uses the VLAN identifier of the packet to obtain the corresponding MGID from mapping table 302.

The switch uses this MGID to obtain an edge port bitmap from MGID table 304. The edge port bitmap represents the edge ports to which the packet should be replicated. An edge port is represented by a bit in the edge port bitmap, and a set (or unset) bit can indicate that the packet should be replicated and forwarded via the corresponding edge port. For example, a bitmap of "11000" can indicate that a packet should be replicated to the first two edge ports of the switch. It should be noted that the length of the edge port bitmap (i.e., the number of bits in the bitmap) can be equal to or greater than the number of edge ports of the switch. MGID table 304 includes edge port bitmaps 314-1, 314-2, . . . , 314-*m*. It should be noted that m and n can be different. A respective entry in MGID table 304 can include a mapping between an edge port bitmap and an MGID, or can be indexed based on MGIDs. Upon obtaining an edge port bitmap, the switch replicates and forwards the packet via the edge ports indicated by the bitmap.

The switch uses its local switch identifier (e.g., an RBridge identifier or an IP address) to obtain an IS port bitmap from a multicast switch identifier (MSID) table 306. The IS port bitmap represents the IS ports to which the packet should be replicated. An IS port is represented by a bit in the IS port bitmap, and a set (or unset) bit can indicate that the packet should be replicated and forwarded via the corresponding IS port. For example, a bitmap of "11000" can indicate that a packet should be replicated to the first two IS ports of the switch. It should be noted that the length of the IS port bitmap can be equal to or greater than the number of switches in a relevant network (e.g., in a fabric switch). MSID table 306 includes IS port bitmaps 316-1, 316-2, . . . , 316-*k*. It should be noted that each of m, n, and k can be different.

A respective entry in MSID table 306 can include a mapping between an IS port bitmap and a switch identifier, or can be indexed based on the egress switch identifiers. Because the ingress and egress switch identifiers of a fabric encapsulation identify the root node of an ingress switch multicast tree, such indexing leads to the IS port bitmap corresponding to that ingress switch multicast tree. Upon obtaining an IS port bitmap, the switch encapsulates the packet in fabric encapsulation, replicates the fabric-encapsulated packet, and forwards the fabric-encapsulated packets via the IS ports indicated by the bitmap. It should be noted that if a switch has no IS port to which the fabric-encapsulated packet should be replicated, a respective bit in the corresponding IS port bitmap can be unset (or set).

In the example in FIG. 2, switch 103 receives a multicast packet 202 via an edge port. Switch 103 obtain an MGID from its mapping table based on a VLAN identifier of packet 202, and obtains an edge port bitmap from its MGID table based on the MGID. Based on this edge port bitmap, switch 103 determines whether packet 202 should be replicated to any other local edge ports. Switch 103 also obtains an IS port bitmap from its MSID table based on the identifier of switch 103. Based on the IS port bitmap, switch 103 determines that fabric-encapsulated packet 204 should be replicated to the local IS ports which couple switches 101, 102, and 104.

Figure 3B:
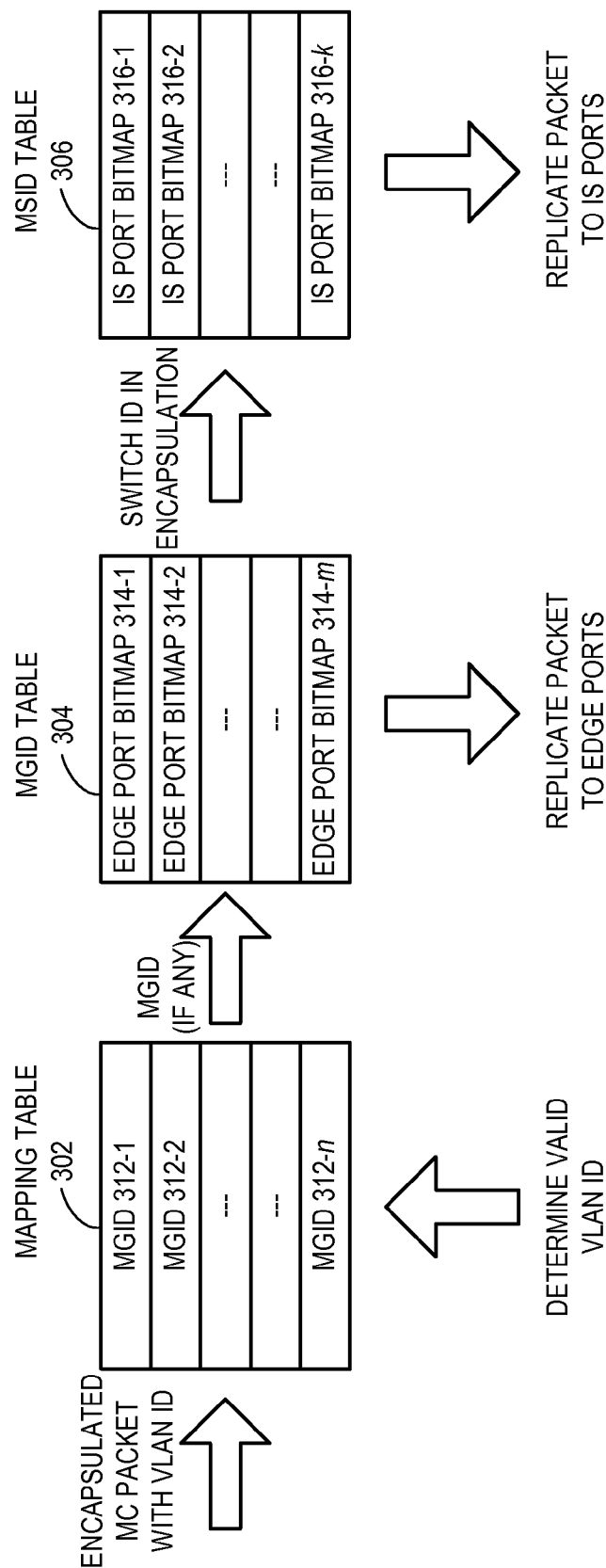
FIG. 3B illustrates an exemplary replication of multicast traffic received from an inter-switch (IS) port via an ingress switch multicast tree in a fabric switch, in accordance with an embodiment of the present invention.

FIG. 3B illustrates an exemplary replication of multicast traffic received from an IS port via an ingress switch multicast tree in a fabric switch, in accordance with an embodiment of the present invention. Upon receiving a fabric-encapsulated multicast packet, a switch determines whether a valid VLAN identifier is included in the fabric-encapsulated packet. A valid VLAN identifier can be for a VLAN which is configured at the switch. If the switch identifies a valid VLAN identifier, the switch obtains an MGID from its mapping table based on the VLAN identifier and obtains an edge port bitmap from its MGID table 304 based on the MGID. Otherwise, the switch does not obtain an MGID from mapping table 302, and therefore does not obtain an edge port bitmap for the fabric-encapsulated packet.

In some embodiments, an edge port bitmap with all bits unset (or set) indicates that the packet should not be replicated to local edge ports. The switch removes the fabric encapsulation and forwards the inner packet via the edge ports indicated by the edge port bitmap. The switch also obtains an IS port bitmap from its MSID table 306 based on the egress switch identifier in the fabric encapsulation. Based on the IS port bitmap, the switch determines the IS ports to which the fabric-encapsulated packet should be replicated.

In the example in FIG. 2, switch 104 receives a fabric-encapsulated multicast packet via an IS port. Switch 104 determines whether a valid VLAN identifier is included in fabric-encapsulated packet 204. A valid VLAN identifier can be for a VLAN which is configured at switch 104. If switch 104 identifies a valid VLAN identifier, switch 104 obtains an MGID from its mapping table based on the VLAN identifier, and obtains an edge port bitmap from its MGID table based on the MGID. Based on this edge port bitmap, switch 104 determines that packet 202 should be replicated to the local edge port which couples end device 116. Switch 104 also obtains an IS port bitmap from its MSID table based on the identifier of switch 103 in fabric encapsulation 212 of packet 204. Based on the IS port bitmap, switch 104 determines that fabric-encapsulated packet 206 should be replicated to the local IS port which couples switch 105.

Figure 3C:
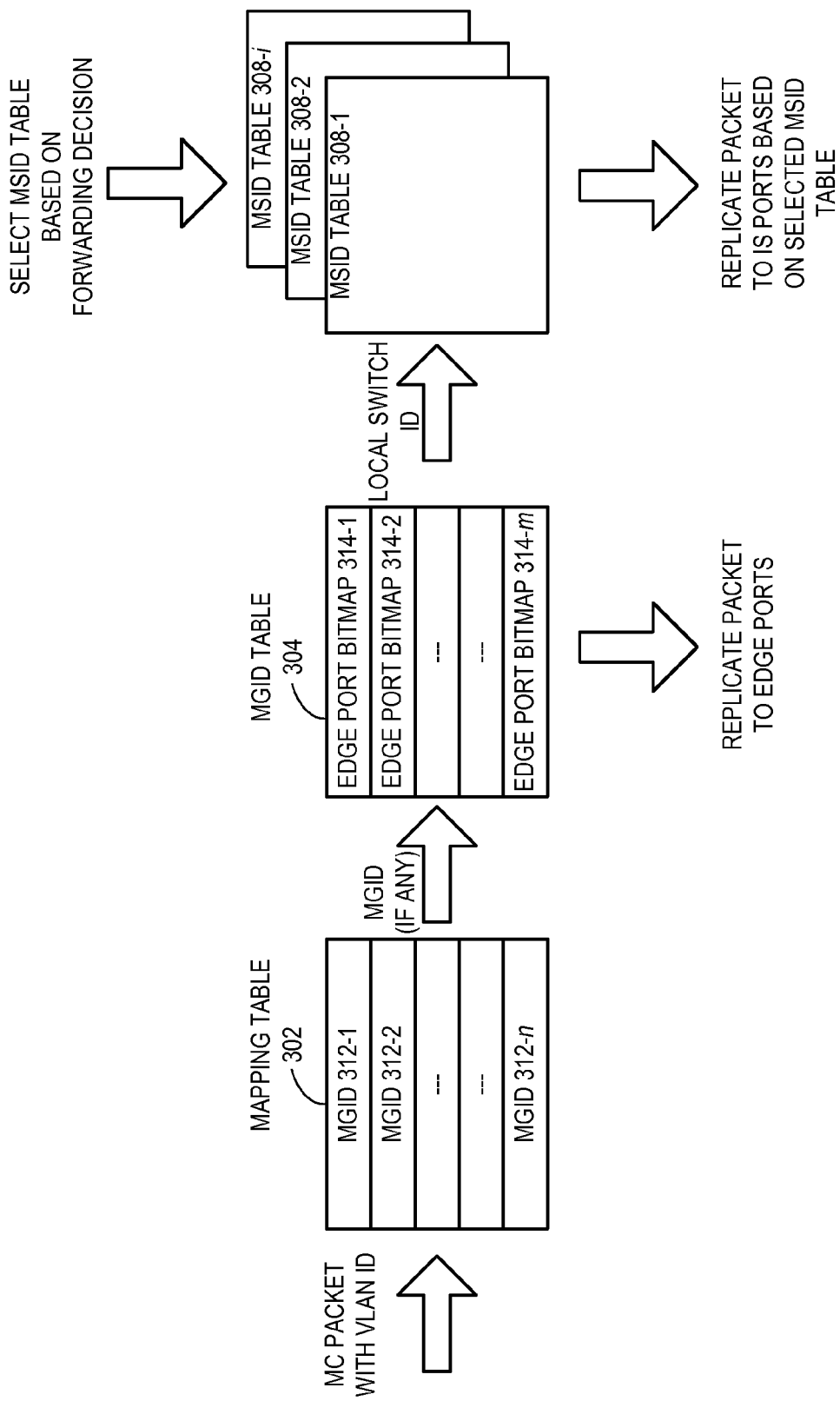
FIG. 3C illustrates an exemplary replication of multicast traffic via one of multiple ingress switch multicast tree instances in a fabric switch, in accordance with an embodiment of the present invention.

FIG. 3C illustrates an exemplary replication of multicast traffic via one of multiple ingress switch multicast tree instances in a fabric switch, in accordance with an embodiment of the present invention. A respective member switch of the fabric switch can support multiple ingress switch multicast tree instances. If there are i such instances, these instances can be represented by a corresponding MSID tables 308-1, 308-2, . . . , 308-*i*, respectively. In some embodiments, an instance corresponds to a multicast group. If a multicast group has presence in a switch, the corresponding MSID table is included in that switch. Otherwise, that instance is not included in the switch, thereby saving hardware resources. This also allows the MSID tables to scale well in the fabric switch for a large number of multicast groups.

In some embodiments, a switch selects an MSID table from MSID tables 308-1, 308-2, . . . , 308-*i* based on a layer-2 or layer-3 forwarding decision. In the example in FIG. 2, switch 103 can examine multicast group information in packet 202. In some embodiments, the payload of packet 202 includes an IP packet comprising a multicast group address. Switch 103 can examine the address to select an MSID table. In some embodiments, fabric encapsulation 212 can include multicast group information. Switch 104 can determine the multicast group from the header information of fabric-encapsulated packet 204. Switch 104 can also examine the outer MAC address (e.g., all-MAC address 220) of fabric-encapsulated packet 204 to select the corresponding MSID table. The outer MAC address can be a multicast MAC address mapped to a multicast group address. It should be noted that when switch 104 receives packet 204, upon selecting a MSID table from its MSID tables, switch 104 obtains an IS port bitmap from the MSID table based on the identifier of switch 103 in fabric encapsulation 212 of packet 204, as described in conjunction with FIG. 3B.

Multicast Forwarding

In the example in FIG. 2, switch 103 receives multicast packet 202 from an edge port, encapsulates packet 202 in fabric encapsulation 212, and forwards fabric-encapsulated packet 204 via its ingress switch multicast tree 133. On the other hand, switch 104 receives fabric-encapsulated packet 204 via an IS port, generates updated fabric encapsulation 214, and further forwards fabric-encapsulated packet 206 via ingress switch multicast tree 133 based on the egress switch identifier, which is the identifier of switch 103, of fabric-encapsulated packet 206.

Figure 4A:
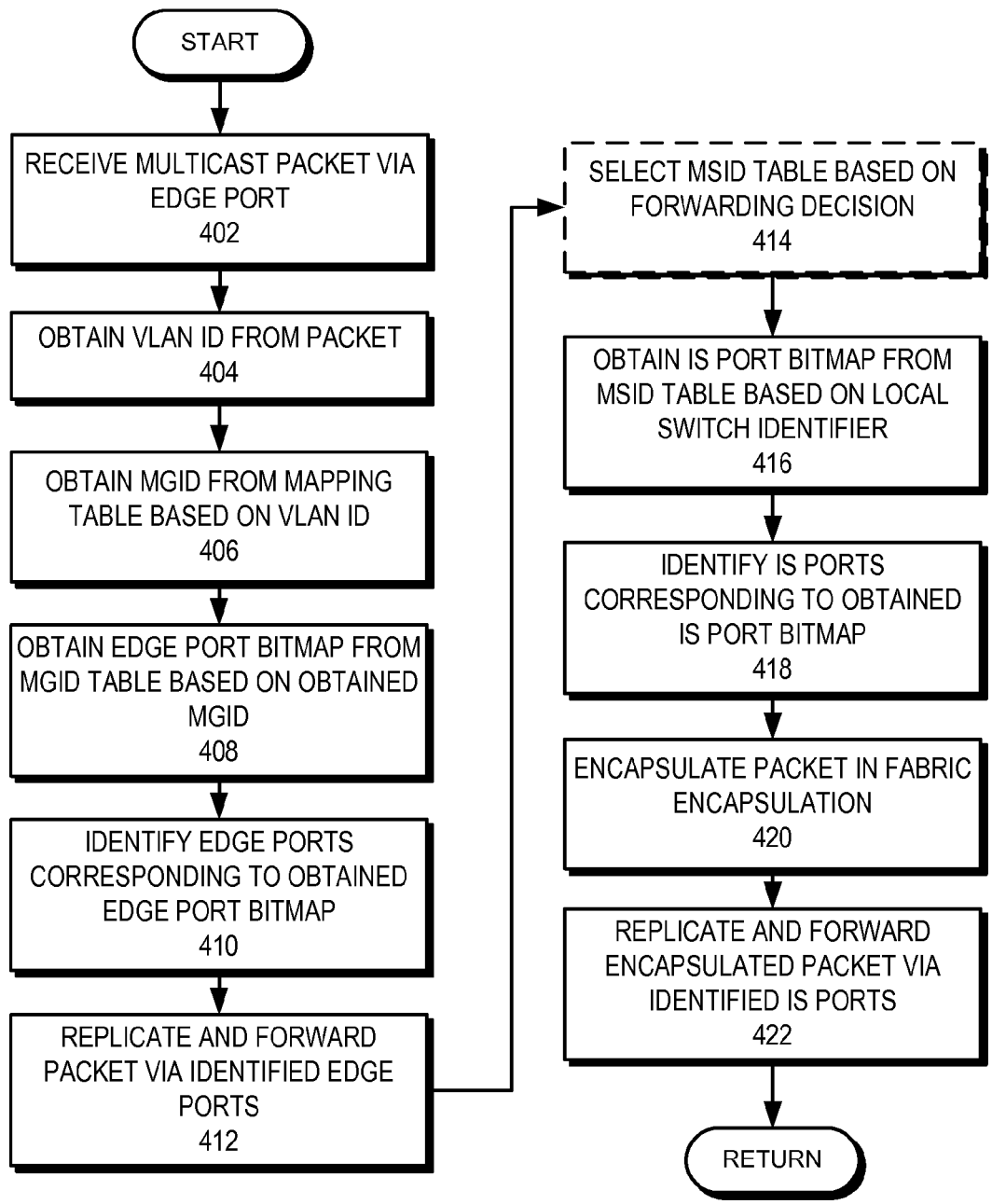
FIG. 4A presents a flowchart illustrating the process of a switch in a fabric switch forwarding multicast traffic received from an edge port via an ingress switch multicast tree, in accordance with an embodiment of the present invention.

FIG. 4A presents a flowchart illustrating the process of a switch in a fabric switch forwarding multicast traffic received from an edge port via an ingress switch multicast tree, in accordance with an embodiment of the present invention. During operation, the switch receives a multicast packet via an edge port (operation 402). In some embodiments, the edge port is an Ethernet port and the packet is an Ethernet frame. The switch obtains the VLAN identifier from the packet (operation 404) and obtains an MGID from a mapping table based on the VLAN identifier (operation 406). The switch can obtain the MGID from an entry in the mapping table comprising a mapping between the VLAN identifier and the MGID, or by using the VLAN identifier as an index of the mapping table.

The switch obtains an edge port bitmap from an MGID table based on the obtained MGID (operation 408). The switch can obtain the edge port bitmap from an entry in the MGID table comprising a mapping between the MGID and the edge port bitmap, or by using the MGID as an index of the MGID table. The switch identifies the edge ports corresponding to the obtained edge port bitmap (operation 410), as described in conjunction with FIG. 3A, and replicates and forwards the packet via the identified edge ports (operation 412). If the switch has multiple MSID table instances, the switch selects an MSID table instance based on the layer-2 and/or layer-3 forwarding decision (operation 414), as described in conjunction with FIG. 3C.

If the switch has selected an MSID table instance (operation 414) and/or has replicated the packet via the edge ports (operation 412), the switch obtains an IS port bitmap from an MSID table based on the local switch identifier (operation 416). The switch can obtain the IS port bitmap from an entry in the MSID table comprising a mapping between the switch identifier and the IS port bitmap, or by using the switch identifier as an index of the MSID table. Examples of the switch identifier include, but are not limited to, a TRILL RBridge identifier, a MAC address, and an IP address. The switch identifies the IS ports corresponding to the obtained IS port bitmap (operation 418), as described in conjunction with FIG. 3A. The switch encapsulates the packet in fabric encapsulation (operation 420), as described in conjunction with FIG. 2, and replicates and forwards the fabric-encapsulated packet via the identified IS ports (operation 422).

Figure 4B:
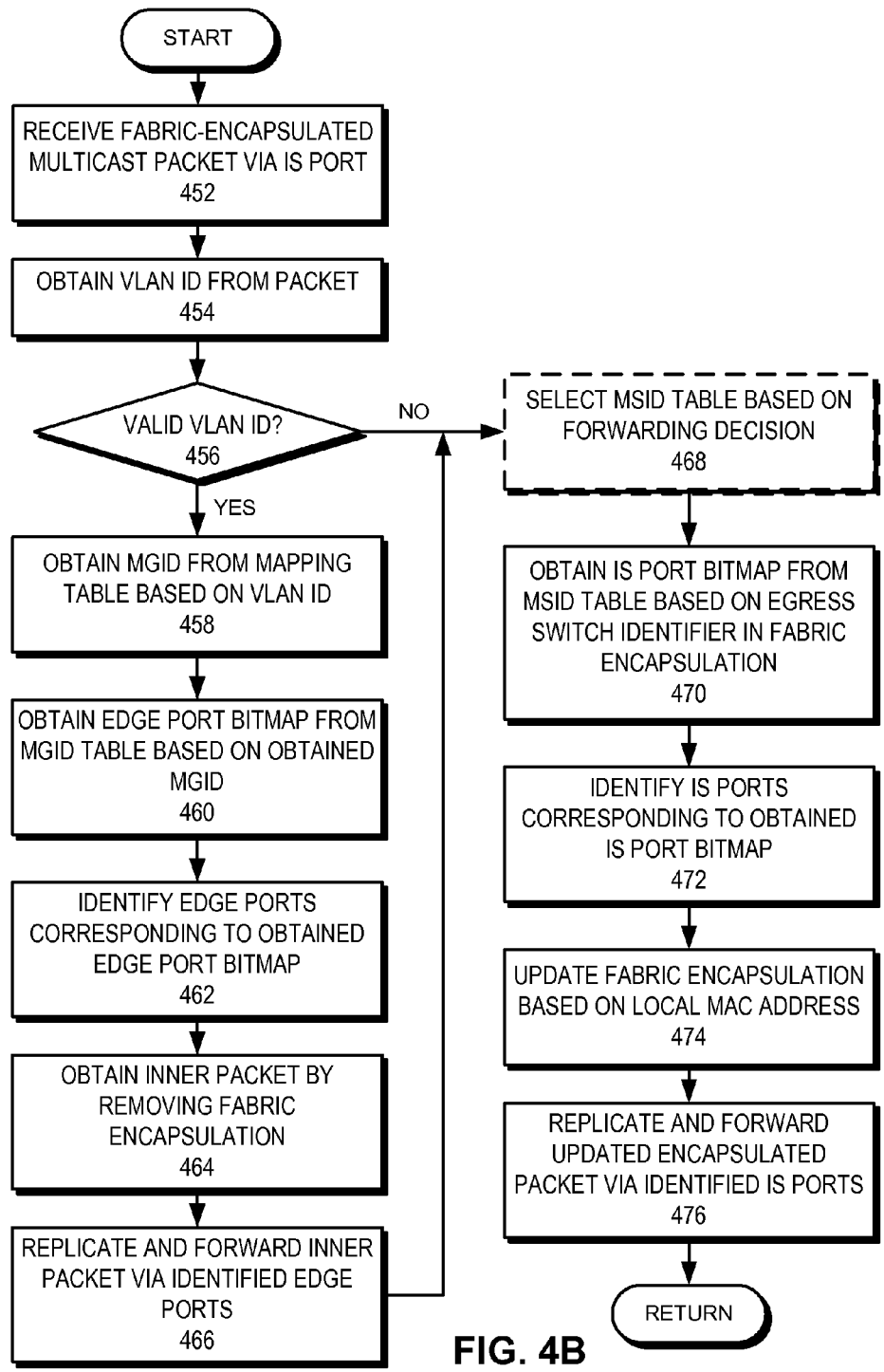
FIG. 4B presents a flowchart illustrating the process of a switch in a fabric switch forwarding multicast traffic received from an IS port via an ingress switch multicast tree, in accordance with an embodiment of the present invention.

FIG. 4B presents a flowchart illustrating the process of a switch in a fabric switch forwarding multicast traffic received from an IS port via an ingress switch multicast tree, in accordance with an embodiment of the present invention. During operation, the switch receives a fabric-encapsulated multicast packet via an IS port (operation 452). Examples of an IS port include, but are not limited to, a TRILL port (e.g., capable of receiving TRILL-encapsulated frames) and a layer-3 port (e.g., configured with an IP address). The switch obtains the VLAN identifier from the packet (operation 454) and checks whether the VLAN identifier is valid (operation 456), as described in conjunction with FIG. 3B. A valid VLAN identifier can be for a VLAN which is configured at the switch. If the switch identifies a valid VLAN identifier, the switch obtains an MGID from a mapping table based on the VLAN identifier (operation 458). The switch can obtain the MGID from an entry in the mapping table comprising a mapping between the VLAN identifier and the MGID, or by using the VLAN identifier as an index of the mapping table.

The switch obtains an edge port bitmap from an MGID table based on the obtained MGID (operation 460). The switch can obtain the edge port bitmap from an entry in the MGID table comprising a mapping between the MGID and the edge port bitmap, or by using the MGID as an index of the MGID table. The switch identifies the edge ports corresponding to the obtained edge port bitmap (operation 462), as described in conjunction with FIG. 3A. The switch obtains the inner packet by removing the fabric encapsulation (operation 464), and replicates and forwards the inner packet via the identified edge ports (operation 466). If the packet does not include a valid VLAN identifier (operation 456) or has replicated the packet via the edge ports (operation 466), and if the switch has multiple MSID table instances, the switch can select an MSID table instance based on the layer-2 and/or layer-3 forwarding decision (operation 468), as described in conjunction with FIG. 3C.

If the switch has selected an MSID table instance (operation 468) and/or has replicated the packet via the edge ports (operation 466), the switch obtains an IS port bitmap from an MSID table based on the egress switch identifier in the fabric encapsulation (operation 470), as described in conjunction with FIG. 2. The switch can obtain the IS port bitmap from an entry in the MSID table comprising a mapping between the switch identifier and the IS port bitmap, or by using the switch identifier as an index of the MSID table. Examples of the switch identifier include, but are not limited to, a TRILL RBridge identifier, a MAC address, and an IP address. The switch identifies the IS ports corresponding to the obtained IS port bitmap (operation 472), as described in conjunction with FIG. 3A. The switch then updates the packet encapsulation in fabric encapsulation (e.g., changes the source MAC address of the outer Ethernet header) (operation 474), as described in conjunction with FIG. 2, and replicates and forwards the updated fabric-encapsulated packet via the identified IS ports (operation 476).

Presence-Based Multicast Trees

Figure 5:
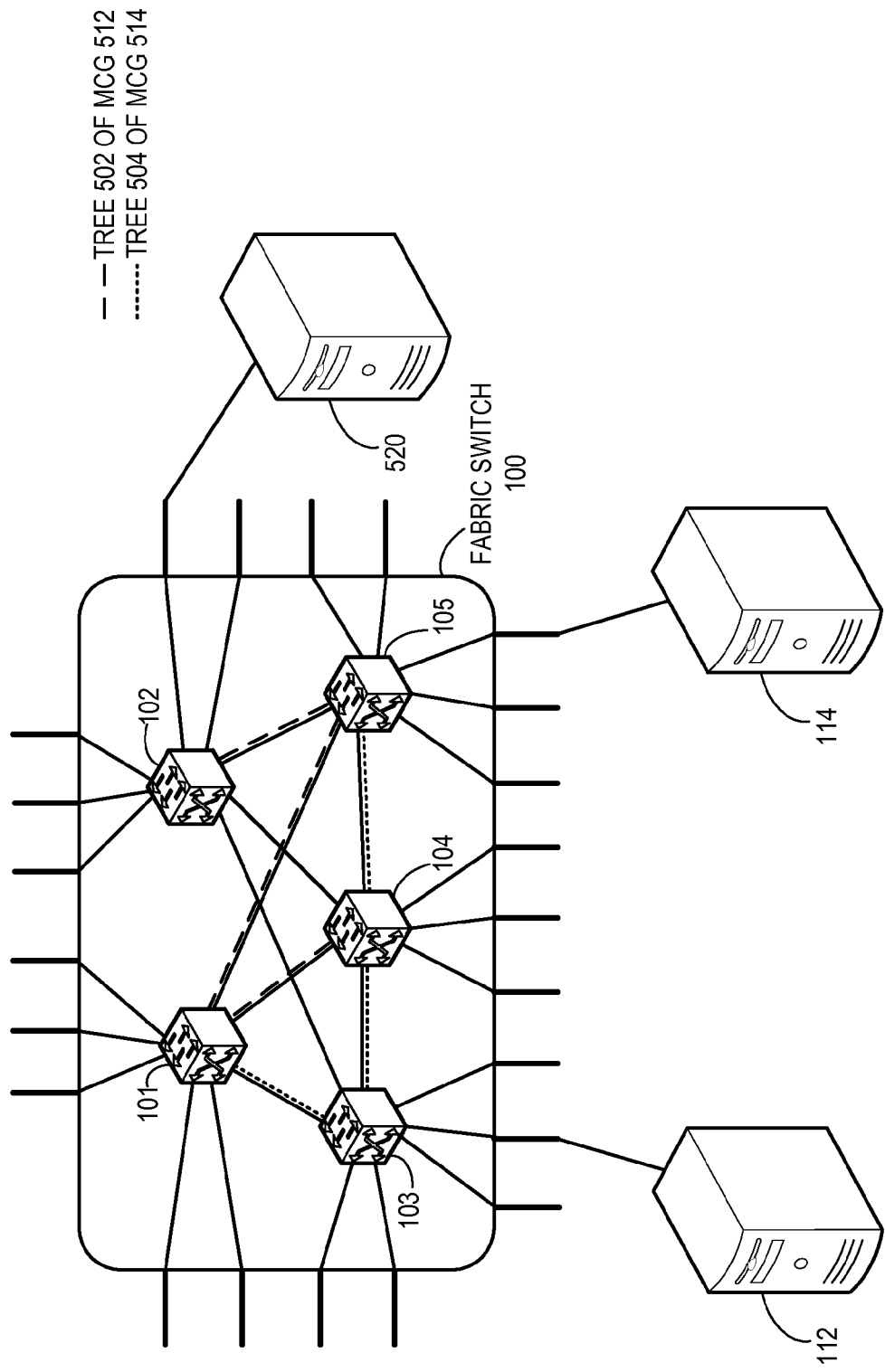
FIG. 5 illustrates exemplary presence-based ingress switch multicast trees in a fabric switch, in accordance with an embodiment of the present invention.

FIG. 5 illustrates exemplary presence-based ingress switch multicast trees in a fabric switch, in accordance with an embodiment of the present invention. A presence-based ingress switch multicast tree spans only the member switches of the fabric switch with a corresponding multicast presence. In the example in FIG. 5, ingress switch multicast trees 502 and 504 are rooted at switch 101. In some embodiments, ingress switch multicast trees 502 and 504 represent corresponding MSID table instances, as described in conjunction with FIG. 3A. Ingress switch multicast trees 502 and 504 represent multicast groups 512 and 514, respectively. Switch 102 is coupled to an end device 520, which is a receiver of traffic of multicast group 512.

Suppose that multicast group 512 does not have presence in switch 103. As a result, switch 103 is not included in ingress switch multicast tree 502. Consequently, multicast group 512 does not need hardware resources on switch 103, which does not include the MSID table instance corresponding to ingress switch multicast tree 502. Similarly, suppose that multicast group 514 does not have presence in switch 102. As a result, switch 102 is not included in ingress switch multicast tree 504. Consequently, multicast group 514 does not need hardware resources on switch 102, which does not include the MSID table instance corresponding to ingress switch multicast tree 504. In this way, a switch uses its hardware resources only for the multicast groups which are present in that switch. This allows efficient scaling of multicast groups in fabric switch 100.

Suppose that switch 102 becomes unavailable (e.g., due to a link or node failure, or reboot event). Under such a scenario, traffic of multicast group 514 does not have any impact on such unavailability. However, this unavailability of switch 102 hinders forwarding traffic of multicast group 512 to end device 520. When switch 102 becomes available again, switch 102 can start receiving traffic of multicast group 512 and start forwarding that traffic to end device 520.

Exemplary Switch

Figure 6:
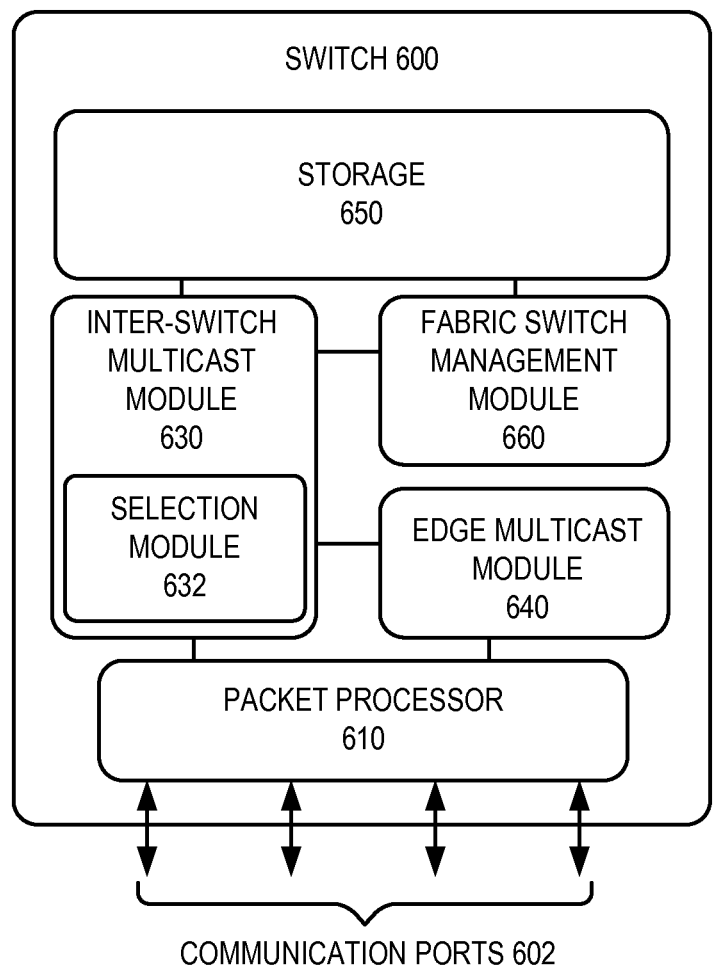
FIG. 6 illustrates an exemplary architecture of a switch with ingress switch multicast tree support, in accordance with an embodiment of the present invention.

FIG. 6 illustrates an exemplary architecture of a switch with ingress switch multicast tree support, in accordance with an embodiment of the present invention. In this example, a switch 600 includes a number of communication ports 602, a packet processor 610, an inter-switch multicast module 630, an edge multicast module 640, and a storage device 650. Packet processor 610 extracts and processes header information from the received frames.

As described in conjunction with FIG. 2, inter-switch multicast module 630 identifies for a first replication of a multicast packet an egress inter-switch port of communication ports 602 in an ingress switch multicast tree of switch 600. Edge multicast module 640 identifies an egress edge port of communication ports 602 for a second replication of the multicast packet based on a local MGID of switch 600. In some embodiments, switch 600 also includes a selection module 632, which selects an MSID table from a plurality of MSID table instances, as described in conjunction with FIG. 3C.

In some embodiments, switch 600 may maintain a membership in a fabric switch, as described in conjunction with FIG. 1A, wherein switch 600 also includes a fabric switch management module 660. Fabric switch management module 660 maintains a configuration database in storage device 650 that maintains the configuration state of every switch within the fabric switch. Fabric switch management module 660 maintains the state of the fabric switch, which is used to join other switches. In some embodiments, switch 600 can be configured to operate in conjunction with a remote switch as an Ethernet switch. Under such a scenario, the first replication of the multicast packet can be encapsulated in a fabric encapsulation of the fabric switch. In some embodiments, edge multicast module 640 also determines whether MGID is associated with the multicast packet based on a VLAN identifier of the multicast packet.

Communication ports 602 can include inter-switch communication channels for communication within a fabric switch. This inter-switch communication channel can be implemented via a regular communication port and based on any open or proprietary format. Communication ports 602 can include one or more TRILL ports capable of receiving frames encapsulated in a TRILL header. Communication ports 602 can also include one or more IP ports capable of receiving IP packets. An IP port is capable of receiving an IP packet and can be configured with an IP address. Packet processor 610 can process TRILL-encapsulated frames and/or IP packets.

Note that the above-mentioned modules can be implemented in hardware as well as in software. In one embodiment, these modules can be embodied in computer-executable instructions stored in a memory, which is coupled to one or more processors in switch 600. When executed, these instructions cause the processor(s) to perform the aforementioned functions.

In summary, embodiments of the present invention provide a switch and a method for facilitating ingress switch multicast trees in a fabric switch. In one embodiment, the switch includes an inter-switch multicast module and an edge multicast module. The inter-switch multicast module identifies for a first replication of a multicast packet an egress inter-switch port in a multicast tree rooted at the switch. The multicast tree is identified by an identifier of the switch. The edge multicast module identifies an egress edge port for a second replication of the multicast packet based on a multicast group identifier. The multicast group identifier is local within the switch.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   an inter-switch multicast module configured to identify, for a first copy of a multicast packet belonging to a multicast group, an egress inter-switch port in a multicast tree rooted at the switch, wherein the multicast tree is identified in a network of interconnected switches by a switch identifier of the switch; and
   an edge multicast module configured to identify an egress edge port for a second copy of the multicast packet based on a multicast replication identifier of the switch, wherein the multicast replication identifier is distinct from an identifier of the multicast group and local within the switch, and wherein the multicast replication identifier is not included in a packet.

2. The switch of claim 1, wherein the inter-switch multicast module identifies the inter-switch port based on a bit value corresponding to the inter-switch port, wherein the bit value is in an inter-switch bitmap associated with the multicast tree, and wherein the inter-switch bitmap indicates which one or more inter-switch ports participate in the multicast tree rooted at the switch.

3. The switch of claim 2, wherein the inter-switch bitmap is included in an entry in a multicast switch identifier table, wherein the entry in the multicast switch identifier table corresponds to the switch identifier of the switch.

4. The switch of claim 3, further comprising a selection module configured to select the multicast switch identifier table from a plurality of multicast switch identifier table instances based on the multicast group of the multicast packet, wherein a respective multicast switch identifier table instance is associated with a corresponding multicast group.

5. The switch of claim 1, wherein the edge multicast module identifies the edge port based on a bit value corresponding to the edge port, wherein the bit value is in an edge bitmap associated with the multicast replication identifier, and wherein the edge bitmap indicates to which one or more edge ports a multicast packet belonging to the multicast group is forwarded.

6. The switch of claim 5, wherein the edge bitmap is included in an entry in a multicast identifier table, wherein the entry in the multicast identifier table corresponds to the multicast replication identifier.

7. The switch of claim 1, wherein the multicast replication identifier is mapped to a virtual local area network (VLAN) identifier of the multicast packet in a mapping table.

8. The switch of claim 1, further comprising a fabric switch management module configured to maintain a membership in the network of interconnected switches, wherein the network of interconnected switches is identified by a fabric identifier.

9. The switch of claim 8, wherein the first copy of the multicast packet is encapsulated with an encapsulation header of the network of interconnected switches; and
wherein the inter-switch multicast module is further configured to identify for a second multicast packet an egress inter-switch port in a second multicast tree rooted at a second switch in the network of interconnected switches, wherein the second multicast tree is identified in the network of interconnected switches by a second switch identifier of the second switch.

10. The switch of claim 9, wherein the edge multicast module is further configured to determine whether the multicast replication identifier is associated with the multicast packet based on a VLAN identifier of the multicast packet.

11. A computer-executable method, comprising:
identifying, for a first copy of a multicast packet belonging to a multicast group, an egress inter-switch port of a switch in a multicast tree rooted at the switch, wherein the multicast tree is identified in a network of interconnected switches by a switch identifier of the switch; and
identifying an egress edge port for a second copy of the multicast packet based on a multicast replication identifier of the switch, wherein the multicast replication identifier is distinct from an identifier of the multicast group and local within the switch, and wherein the multicast replication identifier is not included in a packet.

12. The method of claim 11, wherein the inter-switch port is identified based on a bit value corresponding to the inter-switch port, wherein the bit value is in an inter-switch bitmap associated with the multicast tree, and wherein the inter-switch bitmap indicates which one or more inter-switch ports participate in the multicast tree rooted at the switch.

13. The method of claim 12, wherein the inter-switch bitmap is included in an entry in a multicast switch identifier table, wherein the entry in the multicast switch identifier table corresponds to the switch identifier of the switch.

14. The method of claim 13, further comprising selecting the multicast switch identifier table from a plurality of multicast switch identifier table instances based on the multicast group of the multicast packet, wherein a respective multicast switch identifier table instance is associated with a corresponding multicast group.

15. The method of claim 11, wherein the edge port is identified based on a bit value corresponding to the edge port, wherein the bit value is in an edge bitmap associated with the multicast replication identifier, and wherein the edge bitmap indicates to which one or more edge ports a multicast packet belonging to the multicast group is forwarded.

16. The method of claim 15, wherein the edge bitmap is included in an entry in a multicast identifier table, wherein the entry in the multicast identifier table corresponds to the multicast replication identifier.

17. The method of claim 11, wherein the multicast replication identifier is mapped to a virtual local area network (VLAN) identifier of the multicast packet in a mapping table.

18. The method of claim 11, further comprising maintaining a membership in the network of interconnected switches, wherein the network of interconnected switches is identified by a fabric identifier.

19. The method of claim 18, wherein the first copy of the multicast packet is encapsulated with an encapsulation header of the network of interconnected switches; and
wherein the method further comprises identifying for a second multicast packet an egress inter-switch port in a second multicast tree rooted at a second switch in the network of interconnected switches, wherein the second multicast tree is identified in the network of interconnected switches by a second switch identifier of the second switch.

20. The method of claim 19, further comprising determining whether the multicast replication identifier is associated with the multicast packet based on a VLAN identifier of the multicast packet.

21. A computing system, comprising:
a processor; and
a computer-readable storage medium storing instructions which when executed by the processor cause the processor to perform a method, the method comprising:
identifying, for a first copy of a multicast packet belonging to a multicast group, an egress inter-switch port of a switch in a multicast tree rooted at the switch, wherein the multicast tree is identified by a switch identifier of the switch in a network of interconnected switches; and
identifying an egress edge port for a second copy of the multicast packet based on a multicast replication identifier, wherein the multicast replication identifier is local within the switch.

22. The computing system of claim 21, wherein the inter-switch port is identified based on a bit value corresponding to the inter-switch port, wherein the bit value is in an inter-switch bitmap associated with the multicast tree, wherein the inter-switch bitmap indicates which one or more inter-switch ports participate in the multicast tree rooted at the switch and wherein the inter-switch bitmap is included in an entry in a multicast switch identifier table.

23. The computing system of claim 22, wherein the method further comprises selecting the multicast switch identifier table from a plurality of multicast switch identifier table instances based on the multicast group of the multicast packet, wherein a respective multicast switch identifier table instance is associated with a corresponding multicast group.

24. The computing system of claim 21, wherein the edge port is identified based on a bit value corresponding to the edge port, wherein the bit value is in an edge bitmap associated with the multicast replication identifier, wherein the edge bitmap indicates to which one or more edge ports a multicast packet belonging to the multicast group is forwarded, and wherein the edge bitmap is included in an entry in a multicast identifier table.

25. The computing system of claim 21, wherein the first copy of the multicast packet is encapsulated with an encapsulation header of the network of interconnected switches; and wherein the method further comprises identifying for a second multicast packet an egress inter-switch port in a second multicast tree rooted at a second switch in the network of interconnected switches, wherein the second multicast tree is identified in the network of interconnected switches by a second switch identifier of the second switch.

\* \* \* \* \*